United States Patent [19]

Boeckman

[11] Patent Number: 5,273,511

[45] Date of Patent: Dec. 28, 1993

[54] METHOD TO IMPROVE WELDING OF PROFILED PLASTIC FILM OR TAPE

[75] Inventor: Hugo Boeckman, Arlington Heights, Ill.

[73] Assignee: Illinois Tool Works Inc., Glenview, Ill.

[21] Appl. No.: 39,919

[22] Filed: Mar. 30, 1993

[51] Int. Cl.$^5$ .............................................. B31B 23/64
[52] U.S. Cl. ...................................... 493/195; 493/214; 493/224; 156/251; 156/256
[58] Field of Search ...................... 493/194–; 156/251, 253, 256, 324, 290

[56] References Cited

U.S. PATENT DOCUMENTS

| | | | |
|---|---|---|---|
| 3,986,914 | 10/1976 | Howard | 493/214 |
| 4,024,010 | 5/1977 | Boccia | 156/251 |
| 4,304,615 | 12/1981 | Siegel | 493/194 |
| 4,355,494 | 10/1982 | Tilman | 493/194 |
| 4,892,512 | 1/1990 | Branson | 493/194 |
| 5,019,027 | 5/1991 | Boeckman | 493/214 |

Primary Examiner—Jack Lavinder
Attorney, Agent, or Firm—Kane, Dalsimer, Sullivan, Kurucz, Levy, Eisele and Richard

[57] ABSTRACT

A method for providing a welded side seam area in a plastic bag or package having interlocking male and female profile sections on plies of plastic sheeting material includes the provision of cut-outs through one of the male and female profile sections and contiguous plastic sheeting material at preselected intervals therealong. The welds, which may be provided by a seal bar or jaws, are provided along lines including or passing through the cut-outs. A thinner and more leak-resistant side seam area between bags or packages is the result.

3 Claims, 2 Drawing Sheets

METHOD TO IMPROVE WELDING OF PROFILED PLASTIC FILM OR TAPE

BACKGROUND OF THE INVENTION

1. Field of the Invention

The present invention relates to the manufacture of plastic bags or packages having at least two plies of thermoplastic sheeting, both plies having closure strips formed or included on their facing inner edges so as to form a snap fastener-like closure for the openings of the bags or packages made therefrom.

2. Description of the Prior Art

The present invention relates to improvements in the package-making art and may be practiced, without limitation, in the manufacture of thermoformed bags and thermoformed trays of the kind that may be used for various consumer products, but which are particularly useful for food products which should be kept in substantially air-tight packages, free from leakage until opened for access to the product contents, which packages are desirably reclosable by zipper means to protect any remainder of the product therein.

The indicated art is fairly well developed, but nevertheless is still susceptible of improvements contributing to increased efficiency and cost effectiveness.

One problem that still exists in the production of packages from continuous zipper-equipped sheet material, such as film, especially where the film and zipper are separately formed and then joined, resides in the difficulty in dividing the zippered film into package-oriented sections, because the zipper is of greater mass than the film.

Another problem is represented by the difficulty in attaining a satisfactory sealing of the zipper against leakage, where the zipper and the area of film engaged by the zipper extends through the side seal areas separating one bag or package from the next.

SUMMARY OF THE INVENTION

The present invention provides a solution to the foregoing problems by requiring a cut-out to be made through the female profile section of the plastic zipper before a weld is applied for a permanent joint, the weld being the means by which a side seal is provided, which side seal also separates the zippered film into package-oriented sections. It should be understood that the cut-out is to be made at the point where the weld is subsequently to be made. The weld may be provided by a seal bar or seal jaws.

While the cut-out is preferably made through the female profile section, it may be provided in the male profile section as an alternative. In any event, the cut-out is to be provided through only one of the two (male or female) sections.

Since the cut-out is made through only one of the two profile sections, one need not be concerned about maintaining the coincidence of cut-outs made in both the male and female profile sections, as is required by currently used methods. As a consequence, sealing will not be required to prevent shifting of the profiles relative to one another.

The present invention may be utilized in the manufacture of plastic bags, as well as on plastic zippered containers, tape or film, and will be described in more complete detail below with reference being made to the following figures.

DETAILED DESCRIPTION OF THE PREFERRED EMBODIMENT

Figure 1:
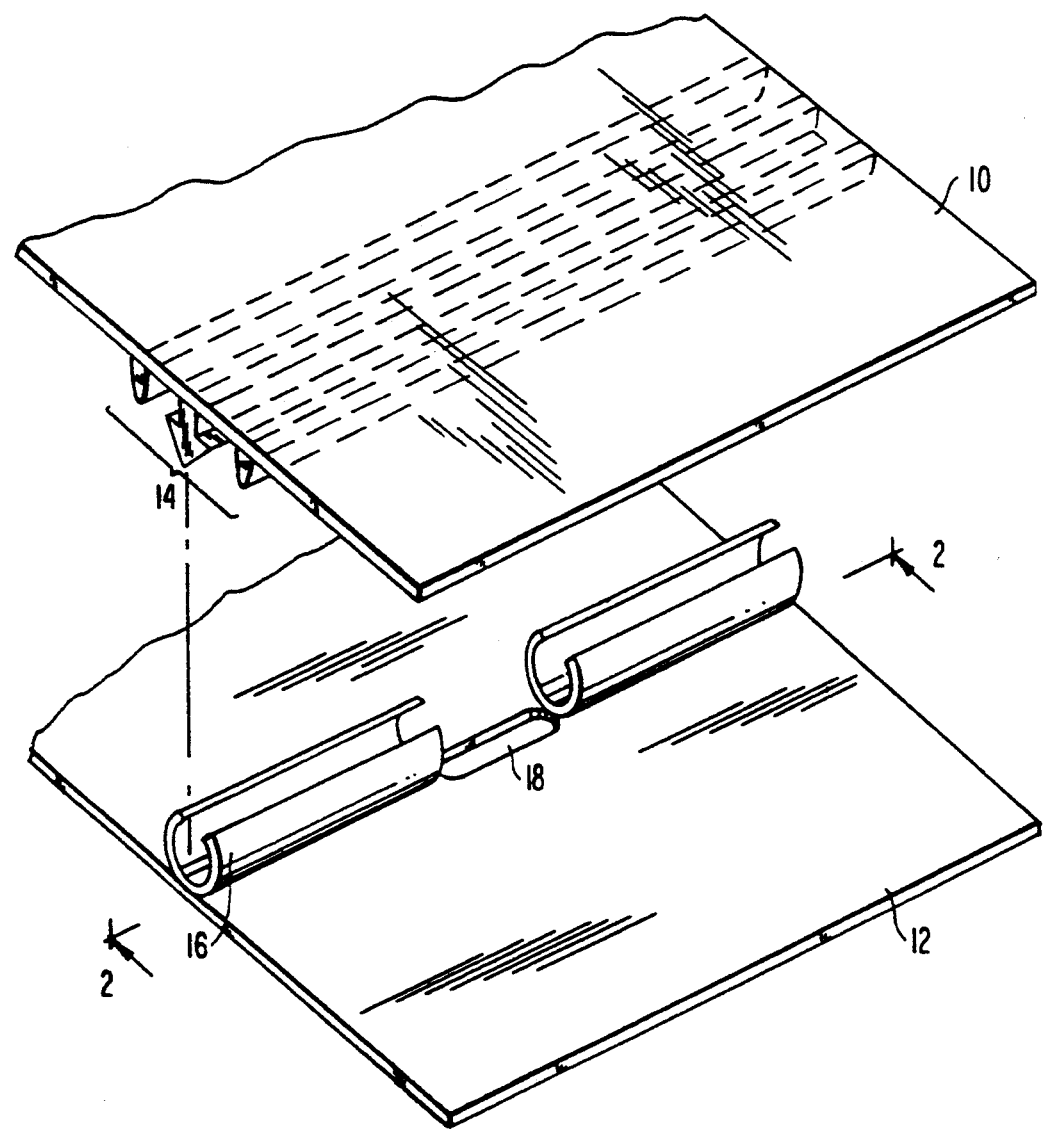
FIG. 1 is a perspective view of two plastic sheets, one of which has a male profile section and the other of which has a female profile section, the latter having a cut-out in accordance with the present invention.

FIG. 1 is a perspective view of two plastic sheets 10,12, which may be two side panels of a plastic bag, two sheet-like parts of a plastic container, or the like. A male profile section 14 is attached to the upper plastic sheet 10 either as a result of having been coextruded therewith or having been extruded and thereafter affixed to the upper plastic sheet 10.

In a similar fashion, a female profile section 16 is attached to the lower plastic sheet 12 either as a result of having been coextruded therewith or having been extruded and thereafter affixed to the lower plastic sheet 12.

A portion of the female profile section 16 has been cut out and a hole 18 provided through the underlying lower plastic sheet 12 in the same operation. Alternatively, a portion of the male profile section 14 may be cut out and a hole 18 provided through the upper plastic sheet 10.

Figure 2:
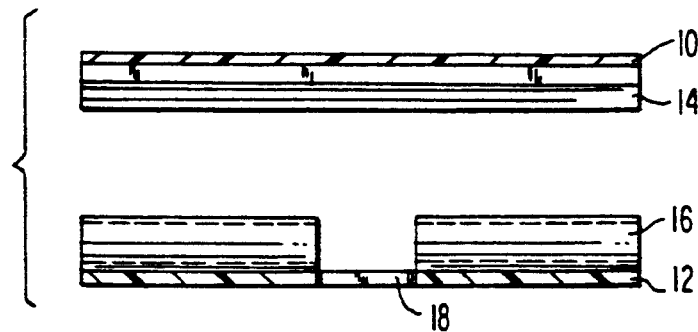
FIG. 2 is a schematic cross-sectional view taken as indicated by line 2—2 in FIG. 1.
Figure 3:
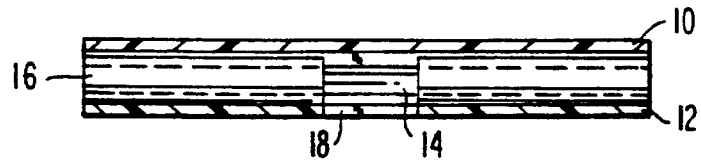
FIG. 3 is the view shown in FIG. 2 after the male profile section has been inserted into the female profile section.

FIG. 2 is a cross-sectional view taken as indicated by line 2—2 in FIG. 1, showing clearly that hole 18 passes through lower plastic sheet 12 beneath the cut-out portion of the female profile section 16. FIG. 3 presents a view of the profiles shown in FIG. 2 after the male profile section 14 has been inserted, or zipped, into the female profile section 16.

Figure 4:
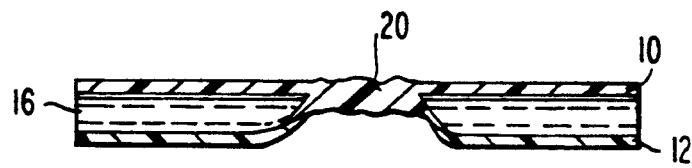
FIG. 4 is the view shown in FIG. 3 after the male profile section has been welded to the female profile section to form a side seal area.

FIG. 4 is the view shown in FIG. 3 after the male profile section 14 has been welded to the female profile section 16 to form a side seal area 20. As may be observed, the welded side seam area 20 is thinner than the unwelded areas on either side. This is the result of material having been removed by cutting out part of the female profile section 16 and providing the hole 18.

The punch unit, which provides the cut-out and hole, may be located in bag making equipment, an extrusion line, a VFFS machine or a HFFS machine.

The present invention offers the manufacturers of plastic bags and other packaging several distinct advantages. For one, it reduces the stomping time required by an ultrasonic welder to flatten the profiled section. This, in turn, leads to the possibility of increased production. Secondly, it decreases the leakage rate in the plastic bags and packages incorporating the invention by closing the profile channels through molten plastic flow. Thirdly, stomping reduces the profile area thickness by 90% compared to the presently realized reduction of 70%. Finally, VFFS and HFFS machines do not require zippered film to be pre-stamped.

It should be readily understood that modifications to the above would be obvious to anyone skilled in the art without departing from the scope of the appended claims.

What is claimed is:

1. A method for providing a welded seam in a plastic package having a zipper comprising:

provide a sheet of plastic material having a continuous female profile section;

providing a sheet of plastic material having a continuous male profile section;

punching a plurality of cut-outs at preselected intervals along one of said continuous female profile section or continuous male profile section, said cut-outs removing sections of one of said profile sections and forming holes through the sheet of plastic material contiguous therewith;

inserting said continuous male profile section into said continuous female profile section to join said sheets of plastic material together; and welding said sheets of plastic material together along lines including said cut-outs.

2. A method as claimed in claim 1 wherein said cut-outs are punched through said continuous female profile section.

3. A method as claimed in claim 1 wherein said cut-outs are punched through said continuous male profile section.

* * * * *